(12) United States Patent
Mohamed et al.

(10) Patent No.: US 12,173,225 B2
(45) Date of Patent: *Dec. 24, 2024

(54) METHOD FOR DRILLING A WELLBORE WITH A REDUCED FERRITE SAG COMPOSITION

(71) Applicant: KING FAHD UNIVERSITY OF PETROLEUM AND MINERALS, Dhahran (SA)

(72) Inventors: Abdelmjeed Mohamed, Dhahran (SA); Salaheldin Elkatatny, Dhahran (SA); Mohamed Mahmoud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 18/489,296

(22) Filed: Oct. 18, 2023

(65) Prior Publication Data

US 2024/0043733 A1    Feb. 8, 2024

Related U.S. Application Data

(63) Continuation of application No. 16/373,137, filed on Apr. 2, 2019, now Pat. No. 11,827,837.

(51) Int. Cl.
  *C09K 8/18* (2006.01)
  *C09K 8/16* (2006.01)

(52) U.S. Cl.
  CPC ............ *C09K 8/18* (2013.01); *C09K 8/16* (2013.01); *C09K 2208/34* (2013.01)

(58) Field of Classification Search
  CPC ........ C09K 8/18; C09K 8/16; C09K 2208/34; C09K 2208/18; C09K 8/14
  See application file for complete search history.

(56) References Cited

U.S. PATENT DOCUMENTS

| | | | |
|---|---|---|---|
| 9,890,323 B2 | 2/2018 | Holtsclaw et al. | |
| 2008/0169130 A1* | 7/2008 | Norman | C09K 8/34 |
| | | | 175/65 |
| 2016/0230070 A1 | 8/2016 | Wagle et al. | |
| 2017/0240748 A9 | 8/2017 | Leutfeld et al. | |
| 2018/0170860 A1 | 6/2018 | Eberhardt et al. | |
| 2020/0377723 A1* | 12/2020 | Bernert | C08G 18/10 |

FOREIGN PATENT DOCUMENTS

| | | |
|---|---|---|
| CN | 107849209 A | 3/2018 |
| CN | 105086961 B | 4/2018 |
| EP | E00339762 | 11/1989 |
| WO | 2004/113467 A1 | 12/2004 |
| WO | 2017/188946 A1 | 11/2017 |

OTHER PUBLICATIONS

NICNAS ; National Industrial Chemicals Notification and Assessment Scheme (NICNAS) ; Public report ; Mar. 2015 ; 23 pages.
Razali, et al. ; Review of biodegradable synthetic-based drilling fluid: Progression, performance and future prospect ; Renewable and Sustainable Energy Reviews 90 ; pp. 171-186 ; Mar. 14, 2018 ; 17 Pages.
Al-Abdullatif, et al. ; Development of New Kill Fluids with Minimum Sagging Problems for High-Pressure Jilh Formation in Saudi Arabia ; Saudi Aramco Journal of technology ; 2015 ; 7 Pages.
Basfar, et al. ; Development of New Kill Fluids with Minimum Sagging Problems for High-Pressure Jilh Formation in Saudi Arabia ; Society of Petroleum Engineers ; 2018 ; 12 Pages.
https://scifinder.cas.org/scifinder/view/substance/substanceDetail.jsf?nav=eNpb85aBtYSB . . . Downloaded on Mar. 2, 2021.
Product data sheet BYK-7420 ES downloaded on Mar. 3, 2021.

* cited by examiner

*Primary Examiner* — Kumar R Bhushan
(74) *Attorney, Agent, or Firm* — Oblon, McClelland, Maier & Neustadt, L.L.P.

(57) ABSTRACT

An drilling mud composition is described, which includes an aqueous base fluid, a viscosifier, and a weighting material The drilling mud composition also includes an anti-sagging agent that comprises a dimethylamino methyl ester, such as methyl 5-(dimethylamino)-2-methyl-5-oxopentanoate. The anti-sagging agent may be used to prevent barite sagging, where barite is used as a weighting material. Small amounts of the anti-sagging agent may be used to maintain a low sag factor while drilling, and without causing unwanted increases in viscosity. The anti-sagging agent is effective for both vertical and inclined wellbores.

15 Claims, 12 Drawing Sheets

METHOD FOR DRILLING A WELLBORE WITH A REDUCED FERRITE SAG COMPOSITION

CROSS-REFERENCE TO RELATED APPLICATIONS

The present application is a Continuation of U.S. application Ser. No. 16/373,137, now allowed, having a filing date of Apr. 2, 2019.

BACKGROUND OF THE INVENTION

Technical Field

The present invention relates to an aqueous-based drilling fluid with low sag tendency.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Drilling fluids play a great role in the success of the drilling operation. in the practice of drilling and producing formations, rive personnel and the environment are exposed to these fluids. Thus, great efforts must be made when selecting and designing drilling fluids that are both effective and safe. Drilling fluids are mainly classified into three categories: water, oil, and gas base.

Drilling fluids are introduced to subterranean formations to fulfill many functions, mainly to control the formation pressure by applying a hydrostatic pressure on the formation. Therefore, the drilling fluid pressure is normally kept higher than the formation pressure. See Bourgoyne Jr. A T, Chenevert M E, Millheim, Keith K, Young Jr F S. 1986. Applied Drilling Engineering. Soc Pet Eng 2:514; and Hossain, M E, and Al-Majed, A A. 2015. Fundamentals of Sustainable Drilling Engineering. John Wiley & Sons, each incorporated herein by reference in their entirety. Consequently, drilling fluid tends to invade the formation and fluid filtrate and solid particles will interact with the formation rocks and fluids. This interaction often causes permanent or temporary damage to the formation leading to a reduction in well productivity. Thus, fluid loss control additives are added to the drilling fluids to minimize the invasion of fluid filtrate and solid particles and reduce the formation damage. There are many types of fluid loss control additives used in the oil industry such as polymers, clays, lime, starch, and bridging agents such as calcium carbonate. See Caenn, R,, Harley, H. C. H., Gray, G. R., 2011. Composition and Properties of Drilling and Completion Fluids, six. ed, Composition and Properties of Drilling and Completion Fluids. Elsevier, incorporated herein by reference in its entirety.

Another function of drilling fluid is to carry the cuttings from beneath the drill bit and transport them all the way to the surface when circulating the drilling fluid. This enables the cuttings to be suspended in the drilling fluid even when the drilling operation stops and prevents any settlement of solid particles. Furthermore, drilling fluids also help lubricate, cool, and clean the drilling bit throughout drilling operations. See Caenn, R., et al., incorporated herein by reference in its entirety.

To properly achieve these functions and to ensure successful and safe drilling operations, drilling fluids should be carefully designed by selecting the appropriate additives to meet the requirements of the drilled formations and downhole conditions and to maintain the required properties of the drilling fluids. Those properties include density, viscosity, gel strength, filtration, pH, and other rheological properties.

Barite is one of the most common weighting materials used in drilling and completion fluids. Its good properties (high density, less environmental impact, and low production cost) outperform other weighting materials and make barite a good candidate for drilling oil and gas wells. However, some problems are encountered with barite weighted drilling and completion fluids, notably: solid invasion, which causes formation damage, and permeability reduction near the wellbore. Another major problem usually encountered when drilling with barite-weighted drilling fluids is solid particle settlement due to gravity, which likely causes well control problems. See Mohamed A K, Elkatatny S A, Mahmoud M A, Shawabkeh R A, Al-Majed A A. 2017. The Evaluation of Micronized Barite as a Weighting Material for Completing HPHT Wells. Paper SPE-183768-MS presented at the SPE Middle East Oil & Gas Show and Conference. Manama, Kingdom of Bahrain, March 6-9, incorporated herein by reference in its entirety.

Barite sag is a challenging phenomenon encountered while drilling with barite-weighted fluids, particularly when drilling deep wells, because of the critical downhole conditions, i.e. high pressure and temperature, that require high density drilling fluids. Barite sag occurs when barite particles separate from the liquid phase and settle down causing variations in mud density that may result in loss of well control. However, it can occur in both vertical and inclined wells and even in static or dynamic conditions.

Barite sag, as a type of solids sag, is a complex phenomenon and very likely to occur in deviated wells, especially in low-shear cases. See Hanson, P. M., Co, M. D. F., Jr, T. K. T., 1990. Investigation of Barite "Sag" in Weighted Drilling Fluids in Highly Deviated Wells. Paper SPE 20423 presented at the 65th Annual Technical Conference and Exhibition. New Orleans. September 23-26, incorporated herein by reference in its entirety. Although it is very difficult to simulate, a good optimization and monitoring for mud rheological properties, sound strategies, and training for drilling personnel would help manage solids sag and mitigate its consequences. See Scott, P. D., Company, M. O., Zamora, M., Aldea, C., 2004. Barite-Sag Management: Challenges, Strategies, Opportunities. Paper IADC/SPE 87136 presented at the IADC/SPE Drilling Conference, Dallas. March 2-4, incorporated herein by reference in its entirety.

Many cases of the sag effect were documented in the literature, for instance, during completing the first well in Hulder - field in the North Sea using barite-weighted oil-based mud, a severe kick was encountered. It occurred because of barite sag, and well geometry contributed in the sag effect. See Saasen, A., Jordal, O. H., Asa, S., Burkhead, D., Berg, P. C., Loklingholm, G., Pedersen, E. S., Asa, S., Turner, J., Harris, M. J., Fluids, C. S., 2002. Drilling HT/HP Wells Using a Cesium Formate Based Drilling Fluid. Paper IADC/SPE 74541 presented at the IADC/SPE Drilling Conference. Dallas. February 26-28, incorporated herein by reference in its entirety. Many research studies were done to mitigate barite sag in water and oil-based drilling and completion fluids.

In 2004, Temple et al. introduced a new method to reduce sag in oil-based and invert emulsion drilling fluid without increasing the viscosity of drilling fluids. Their method comprises adding a low molecular weight polyalkyl methacrylate to the drilling fluid without adding any copolymer such as vinyl pyrrolidone. See Temple, C., Paterson, F., Leith, D., 2004. Method for Reducing Sag in Drilling, Completion and Workover Fluids. WO 2004/113467 A1, incorporated herein by reference in its entirety. Alabdullatif et al. introduced a new formulation of water-based mud to kill over-pressured formations. They combined $Mn_3O_4$ with barite as a weighting material to overcome barite sag tendency that was encountered in previous operations. $Mn_3O_4$ was very effective in enhancing sag performance and minimizing the risk of losing well control, especially after a long time of static condition. See Alabdullatif, Z., Al-yami, A., Wagle, V., Bubshait, A., Al-safran, A., Aramco, S., 2015. Development of New Kill Fluids with Minimum Sagging Problems for High Pressure Jilh Formation in Saudi Arabia. Saudi Aramco J. Technol., incorporated herein by reference in its entirety.

In 2017, Mohamed et al. investigated the effect of reducing barite particle size, to micronized size, on water-based drilling fluid stability using sag test and zeta potential. They concluded that reducing barite particle size to micronized size enhances drilling fluid stability, however, it did not eliminate the problem and more efforts are needed to prevent barite sag. See Mohamed A K, et al., incorporated herein by reference in its entirety Another method to reduce solids sag was introduced by Davis et al. in 2017. They introduced a new fluid formulation that consists of base fluid (invert emulsion), weighting material (barite), and sag stability enhancer. The sag stability enhancer comprises polyethylene glycol (PEG) having a molecular weight of greater than or equal to about 200 g/mol (Davis et al., 2017).

In view of the forgoing, one objective of the present invention is to introduce a new additive to enhance fluid stability and prevent barite sag in water-based drilling, completion, and workover fluids.

BRIEF SUMMARY OF THE INVENTION

According to a first aspect, the present disclosure relates to a drilling mud composition, which has an aqueous base fluid, a viscosifier, a weighting agent, a fluid loss control additive, and an anti-sagging agent comprising a dimethylamino methyl ester.

In one embodiment, the dimethylamino methyl ester is present at a weight percentage in a range of 0.10-1.3 wt %, relative to a total weight of the drilling mud composition.

In one embodiment, the dimethylamino methyl ester is present at a volume percentage in a range of 0.25-3.0 wt %, relative to a total volume of the aqueous base fluid.

In one embodiment, the dimethylamino methyl ester has a molecular weight in a range of 150-250 g/mol.

In one embodiment, the dimethylamino methyl ester is methyl 5-(dimethylamino)-2-methyl-5-oxopentanoate.

In one embodiment, the weighting agent is barite.

In a further embodiment, the barite is in the form of particles having a mean diameter in a range of 20-70 μm.

In one embodiment, the anti-sagging agent further comprises LiCl.

In one embodiment, the drilling mud composition has a density in a range of 8.34-20 ppg.

In one embodiment, a volume concentration of the dimethylamino methyl ester is 0.20-3.0 vol % relative to a total volume of the aqueous base fluid.

In one embodiment, the drilling mud composition further comprises a fluid loss control additive, a defoamer, a clay stabilizer, a bridging agent, an antiscalant, a deflocculant, a lubricant, an anionic polyelectrolyte, and/or a surfactant.

In one embodiment, the drilling mud composition has a sag factor in a range of 0.500-0.520 at a vertical condition at a temperature of 180-270° F. and a pressure of 300-800 psi.

In a further embodiment, the sag factor is 90% or less of a sag factor of a substantially similar drilling mud composition that does not comprise the anti-sagging agent.

In one embodiment, the drilling mud composition has a sag factor in a range of 0.500-0.520 at an inclined condition of 30-60°, at a temperature of 180-270° F., and at a pressure of 300-800 psi.

In a further embodiment, the sag factor is 85% or less of a sag factor of a substantially similar drilling mud composition that does not comprise the anti-sagging agent.

In one embodiment, the drilling mud composition has a ten-second gel strength of 14.0 to 20.0 lbf/100 ft$^2$, and a ten-minute gel strength of 40.0 to 47.0 lbf/100 ft$^2$, at a temperature of 60 to 150° F.

In one embodiment, the drilling mud composition has a yield point in a range of 35 to 47 lbf/100 ft$^2$, at a temperature of 60 to 150° F.

In one embodiment, the drilling mud composition has a plastic viscosity in a range of 24 to 30 cp, at a temperature of 60 to 150° F.

In one embodiment, the drilling mud composition has a yield point to plastic viscosity ratio in a range of 1.15-1.80 lbf/(1000 ft$^2$.cp), at a temperature of 60 to 150° F.

According to a second aspect, the present disclosure relates to a method of drilling a subterranean geological formation. This involves drilling the subterranean geological formation to form a wellbore therein. The drilling mud composition of the first aspect is injected into the subterranean geological formation through the wellbore. The anti-sagging agent prevents sagging of the weighting agent in the wellbore.

In a further embodiment, the wellbore is a vertical wellbore, a horizontal wellbore, a multilateral wellbore, or an extended reach wellbore.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
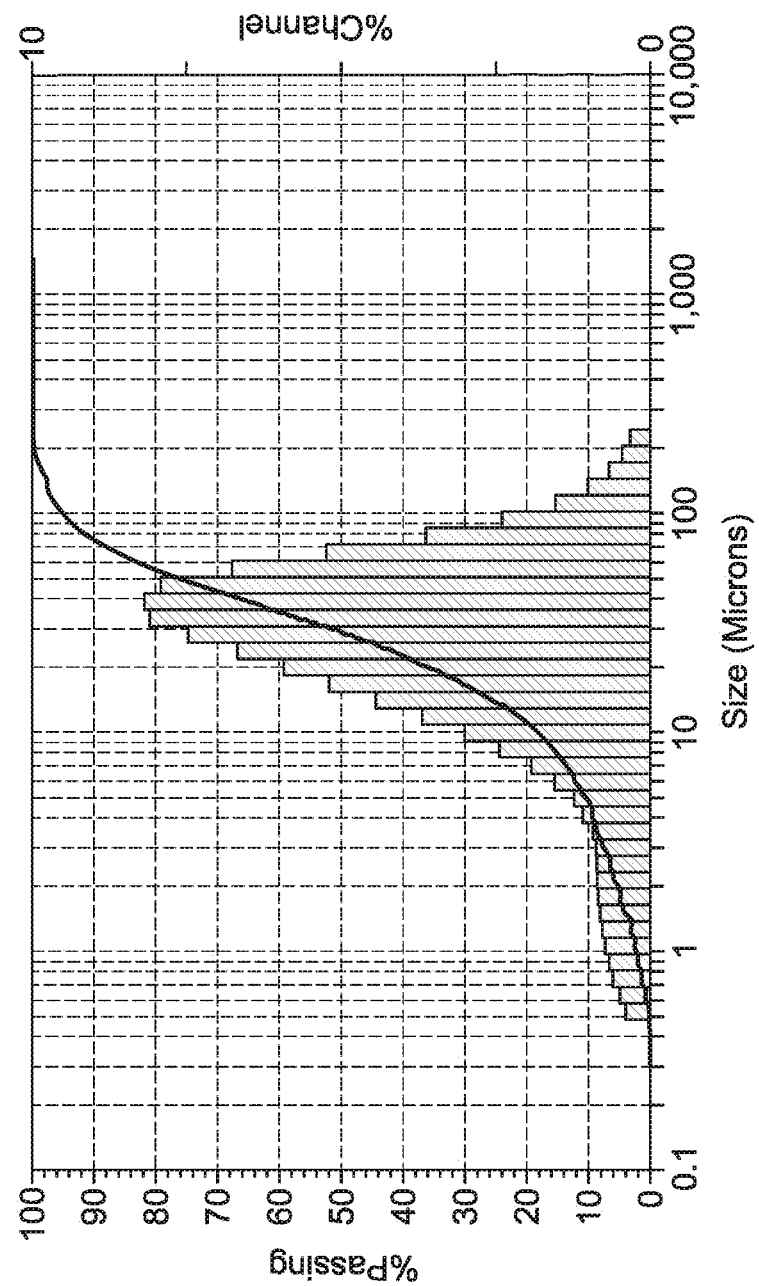
FIG. 1 shows the particle size distribution of the barite sample.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value anchor position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values) Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, is liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

The present disclosure is intended to include all hydration states of a given compound or formula, unless otherwise noted or when heating a material. For example, $Ni(NO_3)_2$ includes anhydrous $Ni(NO_3)_2$, $Ni(NO_3)_2 \cdot 6H_2O$, and any other hydrated forms or mixtures. $CuCl_2$ includes both anhydrous $CuCl_2$ and $CuCl_2 \cdot 2H_2O$.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of nickel include $^{58}Ni$, $^{60}Ni$, $^{61}Ni$, $^{62}Ni$, and $^{64}Ni$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As defined here, a drilling mud composition, or "drilling mud," or "drilling fluid," is a specially designed fluid that is circulated in a wellbore or borehole as the wellbore is being drilled in a subterranean formation to facilitate the drilling operation. As used herein, the term "drilling operation" shall mean drilling, running casing, and/or cementing unless indicated otherwise. The various functions of a drilling fluid include removing drill cuttings from the wellbore, cooling and lubricating the drill bit, aiding in support of the drill pipe and drill bit, and providing a hydrostatic head to maintain the integrity of the wellbore walls and prevent well blowouts. Specific drilling fluid systems are selected to optimize a drilling operation in accordance with the characteristics of a particular geological formation.

As used herein, a "wellbore" includes any geological structure or formation, that may contain various combinations of natural gas (i.e., primarily methane), light hydrocarbon, or non-hydrocarbon gases (including condensable and non-condensable gases), light hydrocarbon liquids, heavy hydrocarbon liquids, crude oil, rock, oil shale, bitumen, oil sands, tar, coal, and/or water. Exemplary non-condensable gases include hydrogen, helium, carbon monoxide, carbon dioxide, methane, and other light hydrocarbons.

According to a first aspect, the present disclosure relates to a drilling mud composition, comprising an anti-sagging agent. The anti-sagging agent comprises or consists of a dimethylamino methyl ester, and the anti-sagging agent may also be called a sag stability enhancer. The dimethylamino methyl ester may be present at a weight percentage in a range of 0.10-0.50 wt %, or 0.10-1.3 wt %, preferably 015-1.2 wt %, more preferably 0.20-1.0 wt %, even more preferably 0.25-0.9 wt %, or 0.25-0.8 wt % relative to a total weight of the drilling mud composition. In alternative embodiments, the dimethylamino methyl ester may be present at a weight percentage greater than 1.3 wt %, for instance, 1.4-1.7 wt %, relative to a total weight of the drilling mud composition.

In one embodiment, the dimethylamino methyl ester is present at a volume percentage in a range of 0.20-3.0 vol %, 0.25-3.0 vol %, preferably 0.3-1.5 vol %, 0.4-1.2 vol % or 0.5-1.0 vol %, more preferably 0.6-0.9 vol %, even more preferably 0.65-0.85 vol %, relative to a total volume of the aqueous base fluid. In alternative embodiments, the dimethylamino methyl ester may be present at a volume percentage greater than 3.0 vol %, for instance, 3.2-3.5 vol %, 3.3-3.6 vol %, or 3.4-4.0 vol %. In one embodiment, the concentration range of 0.25-3.0 vol % relative to a total volume of the aqueous base fluid may be considered equivalent or similar to the concentration range of 0.1-1.3 wt % relative to a total weight of the drilling mud composition.

In one embodiment, the dimethylamino methyl ester has a molecular weight in a range of 100-350 g/ enol, preferably 150-250 g/mol, more preferably 160-240 g/mol, even more preferably 165-200 g/mol. In one embodiment, the dimethylamino methyl ester would not be considered a polymer. In a preferred embodiment, the dimethylamino methyl ester is methyl 5-(dimethylamino)-2-methyl-5-oxopentanoate, and may also go by the name "pentanoic acid, 5-(dimethylamino)-2-methyl-5-oxo-, methyl ester," or by the trade name RHODIASOLV POLARCLEAN. In an alternative, some other modified urea may be used as the dimethylamino methyl ester.

In one embodiment, the dimethylamino methyl ester may be present in the anti-sagging agent at a weight percentage of 40-70 wt %, preferably 50-65 wt %, more preferably 55-62 wt % relative to a total weight of the anti-sagging agent. The anti-sagging agent may also comprise LiCl at a weight percentage of 0.5-4.0 wt %, preferably 0.7-3.0 wt % relative to a total weight of the anti-sagging agent. The remaining weight percentage of the anti-sagging agent may come from water or an aqueous base fluid. The anti-sagging agent may have a dynamic viscosity in a range of 500-900 mPa·s, preferably 600-850 mPa·s, more preferably 650-800 mPa·s, or about 770 mPa·s. The anti-sagging agent may have a density in a range of 1.02-1.18 g/cm$^2$, preferably 1.08-1.14 g/cm$^2$, or about 1.11 g/cm$^2$.

In one embodiment, the drilling mud composition also comprises an aqueous base fluid, a weighting agent and a viscosifier. In some embodiments, the drilling mud composition further comprises a fluid-loss control additive. The aqueous base fluid may refer to any water-containing solution, including saltwater, hard water, and/or fresh water. For purposes of this description, the term "saltwater" will include saltwater with a chloride ion content of between about 6000 ppm and saturation, and is intended to encompass seawater and other types of saltwater including groundwater comprising additional impurities typically found therein. The term "hard water" will include water having mineral concentrations between about 2000 mg/L and about 300,000 mg/L. The term "fresh water" includes water sources that comprise less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium potassium, ammonium, and iron, and anions such as chloride, bicarbonate, carbonate, sulfate, sulfite, phosphate, iodide, nitrate, acetate, citrate, fluoride, and nitrite. The aqueous base fluids are ordinarily classified as saltwater fluids when they contain over 1% salt (about 6000 ppm of chloride ion). As used herein, the term "high density brine" refers to a brine that has a density of about 9.5-10 ppg (pounds per gallon) or greater, which is equivalent to 1.1 g/cm$^3$-1.2 g/cm$^3$ or greater. In one embodiment, the aqueous base fluid is present in the drilling mud composition at a weight percentage of 30-80 wt %, preferably 32-70 wt %, more preferably 35-60 wt %, even more preferably 36-50 wt %, or about 38 wt %, relative to a total weight of the drilling mud composition. In one embodiment, the drilling mud composition may be considered an aqueous-based drilling fluid.

Weighting agents are commonly used to the density of drilling fluids. Barite or barytes (barium sulphate) is a typical weighting agent, although other minerals may be used. Preferably the drilling mud composition comprises a weighting agent, and the weighting agent may be present to produce a desired bulk density in the drilling mud composition. In preferred embodiments, the weighting agent comprises barite particles. Weighting agents other than barite can be used in any of the embodiments described herein. Other weighting agents include minerals such as hematite, magnetite, iron oxides, illmenite, siderite, celestite, dolomite, olivine, calcite, magnesium oxides, halites, calcium carbonate, strontium sulfate, manganese tetraoxide and the like. Other weighting agents can also be envisioned by those of ordinary skill in the art.

The weighting agent may be in the form of particles having a mean diameter or longest dimension in a range of 20-70 μm, preferably 30-60 μm, more preferably 32-50 μm, even more preferably 35-42 μm. However, in some embodiments, the particles may have an average mean diameter of less than 20 μm. In a preferred embodiment, the weighting agent is barite in the form of particles having a diameter of 20-70 μm. The weighting agent may be present in the drilling mud composition at a weight percentage of 30 60 wt %, preferably 35-58 wt %, more preferably 40-57 wt %, or about 55 wt %, relative to a total weight of the drilling mud composition. In one embodiment, the drilling mud composition may be considered a barite-weighted drilling fluid. Further, the drilling mud composition may be considered a barite-weighted aqueous-based drilling fluid.

In one embodiment, barite may be added to form the drilling mud composition from a source that may also comprise impurities, such as sodium sulfate, aluminum oxide, manganese tetraoxide, potassium formate, hematite, siderite, ilmenite, cement, pyrrhotite, gypsum, anhydrite, calcium carbonate, and the like, in a preferred embodiment, an amount of barite in the barite source is at least 80 wt %, preferably at least 90 wt %, preferably at least 95 wt %, preferably at least 99 wt %, relative to a total weight of the barite source. In one embodiment a, barite source may be contacted with a leaching acid prior to forming the drilling mud composition, in order to leach and remove acid-soluble impurities from the pure barite. In one embodiment, the leaching acid is a mineral acid selected from the group consisting of hydrochloric acid and/or sulfuric acid.

As mentioned previously, the drilling mud composition may comprise a viscosifier. In one embodiment, one or more viscosifiers are present in the drilling mud composition at a combined weight percentage of 0.1-2.0 wt %, preferably 0.5-1.5 wt %, more preferably 0.7-1.0 wt %, or about 0.86 wt %, relative to a total weight of the drilling mud composition. Exemplary viscosifiers include, but are not limited to bauxite, bentonite, dolomite, limestone, calcite, vaterite, aragonite, magnesite, taconite, gypsum, quartz, marble, hematite, hectorite, bentonite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, halloy site, xanthan gum (XC-polymer), xanthan gum, guar gum, glycol, carboxymethylcellulose, polyanionic cellulose, and the like. Viscosifiers may also be called "thickeners," and are used to increase the viscosity of the drilling mud composition.

In a preferred embodiment, the viscosifier comprises bentonite. Bentonite is an absorbent aluminum phyllosilicate, an impure clay consisting primarily of montmorillonite. Montmorillonite generally comprises sodium, calcium, aluminum, magnesium, and silicon, and oxides and hydrates thereof. Other compounds may also be present in the bentonite of the present disclosure, including, but not limited to, potassium-containing compounds, and iron-containing compounds. There are different types of bentonite, named for the respective dominant element, such as potassium (K), sodium Na), calcium (Ca) and aluminum (Al). Therefore, in terms of the present disclosure "bentonite" may refer to potassium bentonite, sodium bentonite, calcium bentonite, aluminum bentonite, and mixtures thereof, depending on the relative amounts of potassium, sodium, calcium, and aluminum in the bentonite.

In a preferred embodiment, the drilling mud composition comprises both XC-polymer and bentonite as viscosifiers. Xanthan gum (XC-polymer) is a polysaccharide and biopolymer, and derives its name from the species of bacteria used during the fermentation process, *Xanthomonas campestris*. The addition of XC-polymer may cause the viscosity of the drilling mud composition to decrease with higher shear rates, which behavior is called shear thinning or pseudoplasticity. The XC-polymer and the bentonite may be present with a XC-polymer to bentonite mass ratio in a range of 1:10-10:1, preferably 1:3-1:1, more preferably 1:2-1:4, or about 1:2.7.

In one embodiment, the drilling mud composition comprises one or more fluid loss control additives. Fluid loss control additives limit the loss of drilling fluids into permeable formations. In other words, fluid loss control additives limit the amount of filtrate that permeates into a permeable formation. Fluid loss control additives may also be called "fluid loss additives," or "filtration control additives." These include but are not limited to, starch, guar gum, carboxymethyl cellulose, crospovidone, croscarmellose sodium, sodium starch glycolate polysaccharides, polyanionic cellulose polymer, and acrylic polymers such as polyacrylamide, or a clay deflocculant. Starch includes but is not limited to corn starch, tapioca starch, potato starch. In one embodiment, the fluid loss control additive, or a combined weight of the one or more fluid loss control additives, may be present at a weight percentage of 0.80-1.5 wt %, preferably 1.0-1.2 wt %, or about 1.1 wt % relative to a total weight of the drilling mud composition. In one embodiment, the drilling mud composition may comprise both polyanionic cellulose polymer and starch as fluid loss control additives. The starch may be any commercially available starch used in the field of petroleum extraction, or may be some other type of starch. The polyanionic cellulose polymer may go by the trade name PAC-R. A mass ratio of the starch to the polyanionic cellulose polymer may be in a range of 1:10-10:1, preferably 2:1-8:1, more preferably 3:1-7:1, or about 5.8:1.

In some embodiments, certain additives may have more than one function, or may be grouped with one or more additives. For instance, XC-polymer may be considered both a is viscosifier and a fluid loss control additive.

In one embodiment, the drilling mud composition may comprise a defoamer at a weight percentage of 0.001-0.1 wt %, preferably 0.005-0.05 wt %, more preferably about 0.01 wt %, relative to a total weight of the drilling mud composition. A defoamer helps gas escape from the drilling mud composition. Defoamers include, but are not limited to, glycol, silicone, sulfonated hydrocarbons, octanol, and aluminum stearate. A defoamer may also be called an anti-foam agent or a foam breaker. In one embodiment, the defoamer may be D-AIR 3000, D-AIR 3000L, D-AIR 4000L, NF-1, NF-3, NF-7, D-AIR 2, and/or D-AIR 1, available from Halliburton, or some other defoamer.

In one embodiment, the drilling mud composition may comprise sodium carbonate (also known as "soda ash") at a weight percentage of 0.01-0.5 wt %, preferably 0.05-0.15 wt %, or about 0.08 wt %. The soda ash may be used to maintain calcium levels, and in alternative embodiments, other compounds may be added with or in place of the soda ash for the same purpose.

In one embodiment, the drilling mud composition may comprise a metal hydroxide at a weight percentage of 0.01-0.5 wt %, preferably 0.05-0.15 wt %, or about 0.08 wt %. The metal hydroxide may be NaOH, KOH, LiOH, $Ca(OH)_2$, or some other metal hydroxide. Preferably the metal hydroxide is KOH, and may be added for pH adjustment to achieve a final pH in a range of 8.5-11.5, preferably 9.0-11.0, more preferably 9.2-10.8.

In one embodiment, the drilling mud composition may comprise a clay stabilizer at a weight percentage of 1-5 wt %, preferably 2-4 wt %, or about 3 wt %, relative to a total weight of the drilling mud composition. The clay stabilizer may be a halide salt such as NaCl, NaI, NaBr, KCl, KI, KBr, or some other halide salt. Preferably the clay stabilizer is KCl.

In one embodiment, the drilling mud composition may comprise a bridging agent or bridging material at a weight percentage of 0.1-1.5 wt %, preferably 0.2-1.3 wt %, more preferably 0.6-1.2 wt %, or about 0.8 wt %, relative to a total weight of the drilling mud composition. The role of the bridging agent may be to insert into the pore openings of a formation. The bridging agent may lead to the formation of a filter cake, which prevents loss of drilling fluid. The bridging agent may be calcium carbonate, other suspended salts, or resins. Preferably the bridging agent is calcium carbonate ($CaCO_3$).

In a preferred embodiment, the drilling mud composition comprises water or an aqueous base fluid at a weight percentage of 35-60 wt %, or about 38.5 wt %, a defoamer at about 0.01 wt %, soda ash at about 0.08 wt %, XC-polymer at 0.23-0.25 wt %, bentonite at 0.2-1.0 wt %, or about 0.6 wt %, KOH at about 0.08 wt %, starch at 0.5-1.5 wt % or about 0.9 wt %, poly anionic cellulose polymer at 0.1-0.2 wt % or about 0.15 wt %, KCl at 3-4 wt %, or about 3.15 wt %, $CaCO_3$ at 0.5-1.0 wt %, or about 0.8 wt %, barite (or a barite source) at 30-60 wt %, or about 55 wt %, and the anti-sagging agent at 0.1-1.2, or about 0.6 wt %, each relative to a total weight of the drilling mud composition. In one embodiment, the drilling mud composition consists of water, a defoamer, soda ash, XC-polymer, bentonite, KOH, starch, polyanionic cellulose polymer, KCl, $CaCO_3$, barite, and anti-sagging agent at the weight percentages as previously listed, and the anti-sagging agent consists of water, LiCl, and a dimethylamino methyl ester. In another related embodiment, the drilling mud composition consists of water, a defoamer, soda ash, XC-polymer, bentonite, KOH, starch, polyanionic cellulose polymer, KCl, $CaCO_3$, barite (or a barite source), and anti-sagging agent at the previously listed weight percentages, but here, the anti-sagging agent consists of the dimethylamino methyl ester.

In an alternative embodiment, the drilling mud composition may comprise a surfactant at a weight percentage of 0.1-5.0 wt %, preferably 0.2-1.0 wt %, relative to a total weight of the drilling mud composition. The surfactant may be considered an interfacial tension reducer, though it may also be present to assist with stabilization of an emulsion. Without limitation, illustrative surfactants suitable for use in the drilling mud composition include acid hydrolyzable mixed alkyldiethanol amides, alkyl glucosides, polyalkylglucosides, alkylalkoxypolydimethylsiloxanes, polyakldimethylsiloxanes, fatty acids, soaps of fatty acids, amido amines, polyamides, polyamines, oleate esters, imidazoline derivatives, oxidized crude tall oil, organic phosphate esters, alkyl aromatic sulfates, alkyl aromatic sulfonates, alkyl sulfates, alkyl sulfonates, monoesters of polyalkoxylated sorbitan, polyester polyols, aliphatic alcohol esters, aromatic alcohol esters, ammonium salts of polyacrylic acid, and ammonium salts of 2-acrylamido-2-methylpropane sulfonic acid/acrylic acid copolymer.

In an alternative embodiment, the drilling mud composition may comprise an antiscalant at a weight percentage of 0.1-5.0 wt %, preferably 0.2-1.0 wt %, relative to a total weight of the drilling mud composition. The term "antiscalant" refers to any chemical agent that prevents, slows, minimizes, and/or stops the precipitation of scale (e.g. calcium carbonate, calcium sulfate, barium sulfate, strontium sulfate, calcium phosphate, calcium fluoride, calcium silicate, magnesium hydroxide, zinc carbonate, and the like) from the aqueous salt solution. Antiscalants which may be used in the present disclosure include, phosphine or sodium hexametaphosphate, sodium tripolyphosphate and other inorganic polyphosphates, hydroxy ethylidene diphosphonic acid, butane-tricarboxylic acid, phosphonates, or phosphoric acids such as amino tris (methylenephosphonic acid) (ATMP), etc. carboxyl group-containing starting material acids, maleic acid, acrylic acid and itaconic acid and the like, polycarboxylic acid polymers, sulfonated polymers, vinyl sulfonic acid, allyl sulfonic acid, and 3-allyloxy-2-hydroxy-propionic acid and other vinyl monomers having a sulfonic acid group, or a non-ionic acrylamide monomer from the vinyl copolymer, and the like. Further, organic acids which are safe under the FDA GRAS guidelines for food production yet still effective in decomposition of carbonates found in the soils and in rock formations may be used. The basic principle action of organic acids on carbonates is to cause the disassociation or the carbonate to produce the oxide and carbon dioxide. The first group of suitable organic acids is lactic, acetic, formic, fumaric, citric, oxalic, adipic and uric. The second group of suitable organic acids is the carboxylic acids, whose acidity is associated with their carboxyl group —COOH. Sulfonic acids, containing the group —$SO_2OH$, are relatively stronger acids. The relative stability of the conjugate base of the acid determines its acidity. In some biological systems more complex organic acids such as L-lactic, citric, and D-glucuronic acids are formed. These use the hydroxyl or carboxyl group. The third group of suitable organic acids is humic, sebacic, stearic, gallic, palmitic, caffeic, glyoxylic, fulvic, carnosic, anthranilic, ellagic, lipoic, chlorogenic, rosmarinic, phosphoric, methacrylic, oleanic, nitrohumic, florocinnamic, hexaflorosilicic, hydrofluoric, hydroxycitric and silicofluoric. The fourth group of suitable organic acids includes acetic, malic, citric, tartaric, oxalic, boric, and tnandelic acid. The fifth group of suitable organic acids includes beta hydroxy acids which are a type of phenolic acid. Salicylic acid is a colorless crystalline organic acid, whose main active ingredient is obtained from this source, is a monohydroxybenzoic acid.

In an alternative embodiment, the drilling mud composition may comprise a deflocculant at a weight percentage of 0.1-5.0 wt %, preferably 0.2-1.0 wt %, relative to a total weight of the drilling mud composition. A deflocculant is a chemical additive to prevent a colloid from coming out of suspension or to thin suspensions or slurries, and may be used to reduce viscosity of clay-based fluids. One type of deflocculant is an anionic polyelectrolyte, such as acrylates, polyphosphates, lignosuifonates (Lig), or tannic acid derivates such as quebracho.

In one embodiment, the drilling fluid composition also includes a lubricant, at a weight percentage of 0.1-5.0 wt %, preferably 0.2-1.0 wt %, relative to a total weight of the drilling mud composition, for lubrication and further fluid loss control. The lubricant may be a synthetic oil or a biolubricant, such as those derived from plants and animals, for example, vegetable oils. Synthetic oils include, but are not limited to, polyalpha-olefin (PAO), synthetic esters, polyaklene glycols (PAG), phosphate esters, alkylated naphthalenes (AN), silicate esters, ionic fluids, multiply alkylated cyclopentanes (MAC). Exemplary vegetable oil-based lubricants (i.e. biolubricants) that may be used in the present disclosure include canola oil, castor oil, palm oil, sunflower seed oil, and rapeseed oil from vegetable sources, and tall oil from tree sources, and the like.

A drilling fluid of this disclosure may optionally comprise any number of additional additives. Examples of such additional additives include, without limitation, gelling agents, corrosion inhibitors, rheology control modifiers or thinners, temporary viscosifying agents, high temperature/high pressure control additives, emulsification additives, acids, alkalinity agents, pH buffers, fluorides, gases, nitrogen, carbon dioxide, surface modifying agents, tackifying agents, foamers, catalysts, clay control agents, biocides, bactericides, friction reducers, antifoam agents, dispersants, flocculants, $H_2S$ scavengers, $CO_2$ scavengers, oxygen scavengers, friction reducers, breakers, relative permeability modifiers, resins, particulate materials (e.g., proppant particulates), welling agents, coating enhancement agents, filter cake removal agents, odorants, shale stabilizers, oils, and the like. One or more of these additives may comprise degradable materials that are capable of undergoing irreversible degradation downhole. A person skilled in the art, with the benefit of this disclosure, will recognize the types of additives that may be included in the drilling mud composition for a particular application, without undue experimentation.

In one embodiment, the drilling mud composition has a density in a range of 8.34-20 ppg, preferably 9-18 ppg, more preferably 10-17 ppg, even more preferably 13-16 ppg, or about 15 ppg. This density may be obtained at a temperature in a range of 60-300° F., preferably 80-200° F.

Generally, increased viscosity leads to improved suspension of weighting agents which in turn limits or reduces problematic "sag." However, excessive viscosity can have adverse effects on equivalent circulating density (causing it to increase), which can also lead to problems, particularly in wells where the differences in subterranean formation pore pressures and fracture gradients are small, as commonly encountered in deep water wells.

Under certain well conditions, including without limitation, well geometries, temperatures, and pressures, a phenomenon called "barite sag" or "sag" can occur. "Sag" is generally a significant variation in mud density (>0.5 lbm/gal) along the mud column, which is the result of settling of the weighting agent or weight material and other solids in the drilling fluid. Sag generally results from the inability of the drilling fluid under the particular well conditions to provide adequate suspension properties. Sag may result in formation of a bed of the weighting agents on the low side of the wellbore, and stuck pipe, among other things. In some cases, sag may be deleterious to a drilling operation and lead to hole abandonment.

As described herein, the "sag factor" is the ratio of the bottom density to the sum of the top and bottom densities, each of the same volume of drilling mud composition and following a certain time period of aging. "Sag" generally refers to the tendency of a weighting agent to migrate or settle to the bottom, causing an increase in the sag factor. Suspensions of solids in non-vertical columns are known to settle faster than suspensions in vertical ones. This effect is driven by gravity and impeded by fluid rheology, particularly non-Newtonian and time dependent theology.

A sag factor of exactly 0.5 refers to no difference in top and bottom densities (for both vertical and non-vertical columns), and thus no sag tendency. Some amount of sag is considered acceptable, for instance, drilling fluids that show a sag factor in a range of 0.50-0.53 after aging.

In one embodiment, the sag factor may be measured from a column of fluid having a is length of about 11 cm. In a further embodiment, column of fluid may be housed in an aging cell with a headspace of about 2 cm. For a vertical sag factor measurement, the top density may be measured about 1 cm below the fluid surface, and the bottom density may be measured about 10 cm below the fluid surface (or about 1 cm from the bottom of the column). For an inclined sag factor measurement, the top density may be measured about 1 cm directly below the fluid surface, or 1 cm below the fluid surface parallel to a sidewall of the aging cell. Similarly, the bottom density for an inclined cell may be measured 10 cm below the fluid surface parallel to a sidewall of the aging cell.

In related embodiments, sag stability is found to exist if the density of the bottom 25% of drilling fluid increases by less than about 10% of the base fluid density. The percent change is over at least about 120 hours of static aging and/or if the low shear rheological profile of the drilling fluid changes by less than about ±25%, as measured by the dial reading at a rotation rate of 6 revolutions per minute (rpm) or less on a Farm Model 35 Viscometer.

Drilling fluids in deviated wellbores can exhibit sag in both static and dynamic situations. In this context, static is a totally quiescent fluid state, such as when drilling has ceased; dynamic is any situation where the fluid is exposed to a shear stress, such as for example during drilling. As used hereinafter, the term "sag" shall be understood to include both static and dynamic sag unless specifically indicated otherwise. Preferably the sag described here, especially in relation to certain sag factors, is static, meaning that the sag is measured on a drilling mud composition in an aging cell not exposed to shear stress.

In one embodiment, the drilling mud composition has a sag factor in a range of 0.500-0.520, preferably 0.501-0.515, more preferably 0.502-0.510, or about 0.503, at a vertical condition at a temperature of 180-270° F., preferably 200-265° F., more preferably 220-260° F., or about 250° F. and a pressure of 300-800 psi, preferably 400-700 psi, more preferably 450-650 psi, or about 500 psi. This sag factor may be measured after aging the drilling mud composition at the previously described temperature and pressure conditions for a time period of 6-96 h, preferably 12-48 h, more preferably 18-36 h, or about 24 h. In some embodiments, the sag factor may be in a range of 0.520-0.530, for instance, 0.521-0.523 or 0.525-0.528. In a further embodiment, with the above conditions, the sag factor is 95% or less, preferably 92% or less, more preferably 90% or less, or 89% or less, or 85% or less of a sag factor of a substantially similar drilling mud composition that does not comprise the anti-sagging agent.

Figure 2A:
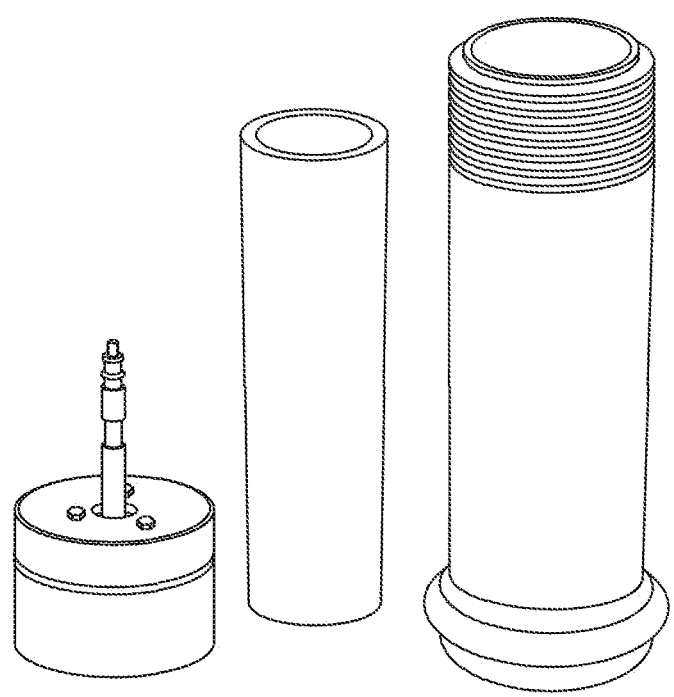
FIG. 2A is the disassembled cell for the sag test.
Figure 2B:
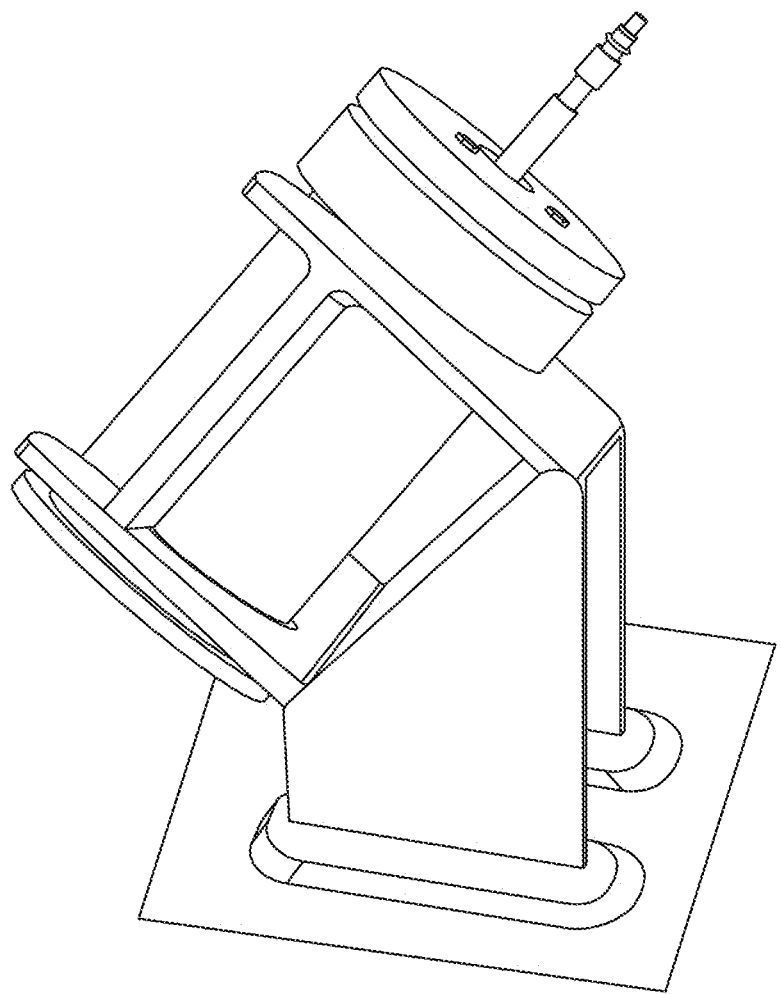
FIG. 2B is the sag test set up at an inclined condition.

As described herein, the "inclined position" means that the aging cell or other vessel containing the drilling mud composition, is turned at an angle in a range of 30-60°, preferably 35-55°, more preferably 40-50°, or about 45° from the vertical. FIG. 2B shows an example of an aging cell at an inclined position; FIG. 2A shows a disassembled aging cell having parts in a vertical position.

In one embodiment, the drilling mud composition at an inclined position has a sag factor in a similar range (or most preferably, about 0.504), at similar temperature, pressure and aging conditions. In some embodiments, the sag factor may be in a range of 0.520-0.530, for instance, 0.521-0.523 or 0.525-0.528. With these conditions and at the inclined position, the sag factor is 90% or less, 87% or less, preferably 85% or less, 83% or less, 80% or less of a sag factor of a substantially similar drilling mud composition at a similar incline that does not comprise the anti-sagging agent.

As used herein, the term "gel strength" refers to the shear stress measured at a low shear rate after a drilling fluid has set quiescently for a set period of time. According to standard API procedures, the gel strength is measured after setting for 10 seconds and 10 minutes, although measurements at longer time intervals can also be made such as, for example, 30 minutes or 16 hours.

In one embodiment, the drilling mud composition has a ten-second gel strength of 14.0 to 20.0 lbf/100 ft$^2$, preferably 15.0 to 19.5 lbf/100 ft$^2$, more preferably 17.0 to 19.0 lbf/100 ft$^2$, or about 18 lbf/100 ft$^2$, and a ten-minute gel strength of 40.0 to 47.0 lbf/100 ft$^2$, preferably 42.0 to 46.5 lbf/100 ft$^2$, more preferably 43.0 to 46.0 lbf/100 ft$^2$, or about 45 lbf/100 ft$^2$. These gel strengths may be measured at a temperature of 60 to 150° F., preferably 70 to 100° F., more preferably 75 to 90° F., or about 80° F.

As used herein, the term "yield point" refers to a parameter of the Bingham plastic model, where yield point refers to the yield stress extrapolated to a shear rate of zero.

In one embodiment, the drilling mud composition has a yield point in a range of 35 to 47 lbf/100 ft$^2$, preferably 36 to 45 lbf/100 ft$^2$, more preferably 37 to 43 lbf/100 ft$^2$, even more preferably 38 to 42 lbf/100 ft$^2$, or about 40 lbf/100 ft$^2$, at a temperature of 60 to 150° F., preferably 70 to 100° F., more preferably 75 to 90° F., or about 80° F.

In one embodiment, the drilling mud composition has a plastic viscosity in a range of 24 to 30 cp, preferably 24.5 to 28 cp, more preferably 25 to 27 cp, or about 26 cp at a temperature of 60 to 150° F., preferably 70 to 100° F., more preferably 75 to 90° F., or about 80° F.

In one embodiment, the drilling mud composition has a yield point to plastic viscosity ratio in a range of 1.15-1.80 lbf/(100 ft$^2$·cp), preferably 1.30-1.70 lbf/(100 ft$^2$·cp), more preferably 1.50-1.60 lbf/(100 ft$^2$·cp), or about 1.54 lbf/(100 ft$^2$·cp), at a temperature of 60 to 150° F., preferably 70 to 100° F., more preferably 75 to 90° F., or about 80° F.

Preferably, the presence of the anti-sagging agent does not significantly affect filtration performance. In one embodiment, the drilling mud composition has a filtrate volume that is within 20%, preferably with 18%, more preferably within 16% of the filtrate volume of a substantially similar drilling mud composition that does not have the anti-sagging agent and is subjected to the same filtration conditions. In one embodiment, these filtration conditions may involve a pressure in a range of 100-500 psi, preferably 150-450 psi, more preferably 200-400 psi, or about 300 psi. A temperature during the filtration may be in a range of 100-500 ° F., preferably 150-450° F., even more preferably 200-300° F., or about 250° F. A median pore size of the permeable formation or of the filtration medium may be in a range of 1-100 μm, preferably 10-80 μm, more preferably 30-70 μm. In one embodiment, the filtrate volume may be measured after a filtration time period in a range of 10-60 min, preferably 20-50 mm, more preferably about 30 min.

The drilling mud composition may be prepared by any suitable means known in the art. In some embodiments, the drilling mud composition may be prepared at a well site or at an offsite location. Once prepared, the drilling mud composition may be placed in a tank, bin, or other container for storage and/or transport to the site to use. In other embodiments, the drilling mud composition may be prepared on-site, for example, using continuous mixing, on-the-fly mixing, or real-time mixing methods. In certain embodiments, these methods of mixing may include methods of combining two or more components wherein a flowing stream of one element is continuously introduced into flowing stream of another component so that the streams are combined and mixed while continuing to flow as a single stream as part of the ongoing treatment. In some embodiments, the drilling mud composition may be made by a specific order of adding and mixing components. For instance, the weighting agent may be added last. Also, the anti-sagging agent may be added second to last, or right before the weighting agent. In some embodiments, mixing may proceed for a period of 1-30 minutes following the addition of each component, or similar components (for instance two fluid loss control agents may be added simultaneously while mixing). In one embodiment, the drilling mud composition may be formed by mixing the components in the order shown in Table 2.

According to a second aspect, the present disclosure relates to a method of drilling a subterranean geological formation using the drilling mud composition. This method involves drilling the subterranean geological formation to form a wellbore therein. The drilling mud composition of the first aspect is injected into the subterranean geological formation through the wellbore, often during the drilling. The anti-sagging agent prevents sagging of the weighting agent in the wellbore. In one embodiment, the wellbore is a vertical wellbore, a horizontal wellbore, a multilateral wellbore, or an extended reach wellbore. A pumping system may be used to circulate drilling mud composition in the wellbore during the drilling.

The drilling mud composition be used during or in conjunction with other operations, such as pre-flush treatments, after-flush treatments, hydraulic fracturing treatments, sand control treatments (e.g., gravel packing), "frac pack" treatments, acidizing treatments (e.g., matrix acidizing or fracture acidizing), wellbore clean-out treatments, cementing operations, workover treatments/fluids, and other operations where the dolling mud composition may be useful. In this sense, the drilling mud composition may also be considered a completion or workover fluid.

The examples below are intended to further illustrate protocols for preparing, characterizing the drilling mud composition, and uses thereof, and are not intended to limit the scope of the claims.

EXAMPLE 1

Materials

A sample of commercial barite (obtained from a local supplier) with an average particle size of 30 microns was used in this study as a weighting material for water-based drilling fluid. The barite sample mainly contains 82 wt. % barium, 12.6 wt. % sulfur, and some other impurities. Table 1 lists the elemental composition of the barite sample that was obtained using X-ray fluorescence technique (XRF). The particle size distribution of barite sample is shown in FIG. 1. Some additives (obtained from local supplier) were used to formulate the drilling fluid. Soda ash was used to maintain the level of calcium in the water. Bentonite and Xanthan polymer were used as viscosifiers to enhance the rheological properties of the drilling fluid. Starch and PAC-R were used to control fluid loss. Clay stabilization was maintained by adding potassium chloride to the drilling fluid. Calcium carbonate was used as a bridging agent. See Caenn, R., et al., incorporated herein by reference in its entirety. Table 2 shows the drilling fluid formulation used in this study. The dimethylamino methyl ester-containing additive was added in different concentrations to enhance the stability of the drilling fluid and prevent solid settlement. Table 3 shows the properties and the main components of the dimethylamino methyl ester-containing additive.

TABLE 1

The elemental composition of barite sample using XRF technique.

| Element | wt. % | mol % |
|---------|---------|---------|
| Si | 1.9916 | 6.3483 |
| S | 12.6341 | 35.275 |
| K | 0.6331 | 1.4498 |
| Ca | 0.1109 | 0.2478 |
| Fe | 1.3338 | 2.1383 |
| Ni | 0.0157 | 0.024 |
| Cu | 0.0354 | 0.0499 |
| Sr | 0.5518 | 0.5638 |
| Mo | 0.017 | 0.0159 |
| Ba | 82.6171 | 53.8602 |
| Ta | 0.023 | 0.0114 |
| Pb | 0.0366 | 0.0158 |

TABLE 2

Drilling fluid formulation.

| Component | Description | Field Units/Lab Units | Mixing Time, min | Function |
|-----------|-------------|----------------------|------------------|----------|
| Water | 0.7 | bbl | — | Base |
| Defoamer | 0.08 | lb/g | 1 | Anti-foam agent |
| Soda ash | 0.5 | lb/g | 1 | Maintain calcium level |
| XC-polymer | 1.5 | lb/g | 20 | Viscosifier |
| Bentonite | 4 | lb/g | 10 | Viscosifier |
| KOH | 0.5 | lb/g | 1 | pH adjustment |
| Starch | 6 | lb/g | 10 | Fluid loss control |
| PAC-R | 1 | lb/g | 10 | Fluid loss control |
| KCl | 20 | lb/g | 10 | Clay stabilizer |
| CaCO$_3$ | 5 | lb/g | 10 | Bridging agent |
| Barite | 350 | lb/g | 10 | Weighting material |

TABLE 3

Properties and main components of the dimethylamino methyl ester-containing additive.

| Parameter | Description |
|-----------|-------------|
| Main components | [Pentanoic acid, 5-(dimethylamino)-2-methyl-5-oxo-, methyl ester] 58-59% [Lithium chloride] 1-2% |
| Density | 1.11 g/cc |
| Dynamic viscosity | 770 mPa · s |
| Water solubility | Completely miscible |
| Flash point | >212° F. |

EXAMPLE 2

Experimental—Fluid Preparation and Rheology Measurements

A barite-weighted drilling fluid, 15 ppg, was prepared using drilling fluid additives. Water was added with a ratio of 0.7 bbl (245 g in laboratory units) and poured in the drilling fluid mixer container. Defoamer and soda ash were added to prevent the formation of foam and to maintain the level of calcium in water, respectively. See Caenn, R., et al., incorporated herein by reference in its entirety. Then, other additives were added and mixed for a specific time, starting with viscosity control agents bentonite and xanthan polymer. The mixing started with low rotational speed then the speed was increased gradually as the viscosity built up. Table 2 lists all drilling fluid additives, their amounts and functions, and the mixing time. Following the same procedure, several samples of drilling fluid were prepared by adding different ratios of the new additive to the drilling fluid formulation (0.5, 1, 1.5, 2, and 3 vol. % of the total base fluid). The anti-sagging additive was added right before adding the weighting material and mixed for 5 minutes. After fluid preparation, fluid density was measured using mud balance, and theological properties were measured at low and high temperatures to study the effect of adding the new additive on drilling fluid rheology at different well conditions.

EXAMPLE 3

Experimental—Sag Tests

A sag test was conducted to study the effect of adding the new additive on barite sag tendency. First, a drilling fluid sample was agitated using drilling fluid mixer. An aging cell was used to contain and keep the fluid pressurized. A pressure of 500 psi was applied using nitrogen to prevent fluid from evaporation and the aging cell was kept in the oven for 24 hours at specific temperature and static conditions. The sag test was conducted at both vertical and inclined conditions (45 degrees). After 24 hours, the cell was taken out and left to cool down and the pressure was released. Afterwards, two fluid samples were taken from the top and the bottom of the cell. The densities of the two samples were measured and the sag factor was calculated using Equation 1.

$$\text{Sag Factor} = \frac{\rho_{Bottom}}{\rho_{Bottom} + \rho_{Top}} \quad (1)$$

where $\rho_{Bottom}$=Bottom density in ppg, and $\rho_{Top}$=top density in ppg. A fluid having a sag factor between 0.5 and 0.53 will have a good sag performance, while a sag factor greater than 0.53 will result in a bad sag performance where solid particle settlement is likely. See Alabdullatif et al., 2015; and Maxey, J., 2007. Rheological Analysis of Static and Dynamic Sag in Drilling Fluids. Paper presented at Nordic Rheology Conference. Stavanger, each incorporated herein by reference in their entirety. FIGS. 2A and 2B shows sag test setup for vertical and inclined conditions. More specifically, FIG. 2A shows the disassembled cell, and FIG. 2B shows the cell assembled and inclined at a 45° angle.

EXAMPLE 4

Experimental—HPHT Filtration Experiments

Drilling fluid samples were agitated for 10 minutes, and then poured into the filtration cell to investigate the effect of the new additive on filtration performance of the drilling fluid. The filtration experiments were performed at 250° F. and 300 psi, using a 50-micron ceramic filter disc. The cell was heated up to 250° F. under a pressure of 300 psi which was applied using nitrogen gas. Then, the experiments were started, and the filtrate volume was recorded with time. The experiments were run for 30 minutes. Afterwards, the filter cake was characterized by measuring its weight and thickness. Table 4 summarizes the filtration experiment conditions.

TABLE 4

Filtration experiments conditions.

| Parameter | Description |
| --- | --- |
| Fluid volume | 350 mL |
| Pressure | 300 psi |
| Temperature | 250° F. |
| Experiment duration | 30 min |
| Ceramic filter disc | 50-micron |

EXAMPLE 5

Results and Discussion

Figure 3:
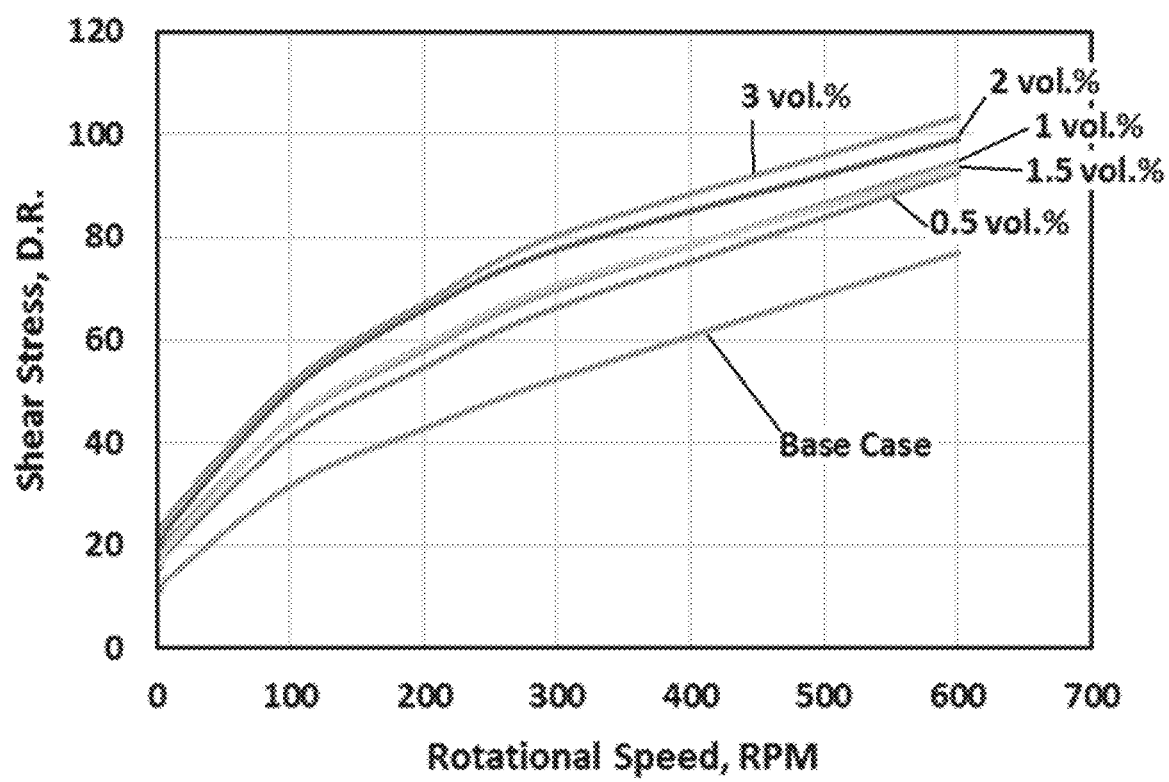
FIG. 3 is a graph showing the effect of additive concentration on drilling fluid shear stress vs. shear rate (80° F.).
Figure 4:
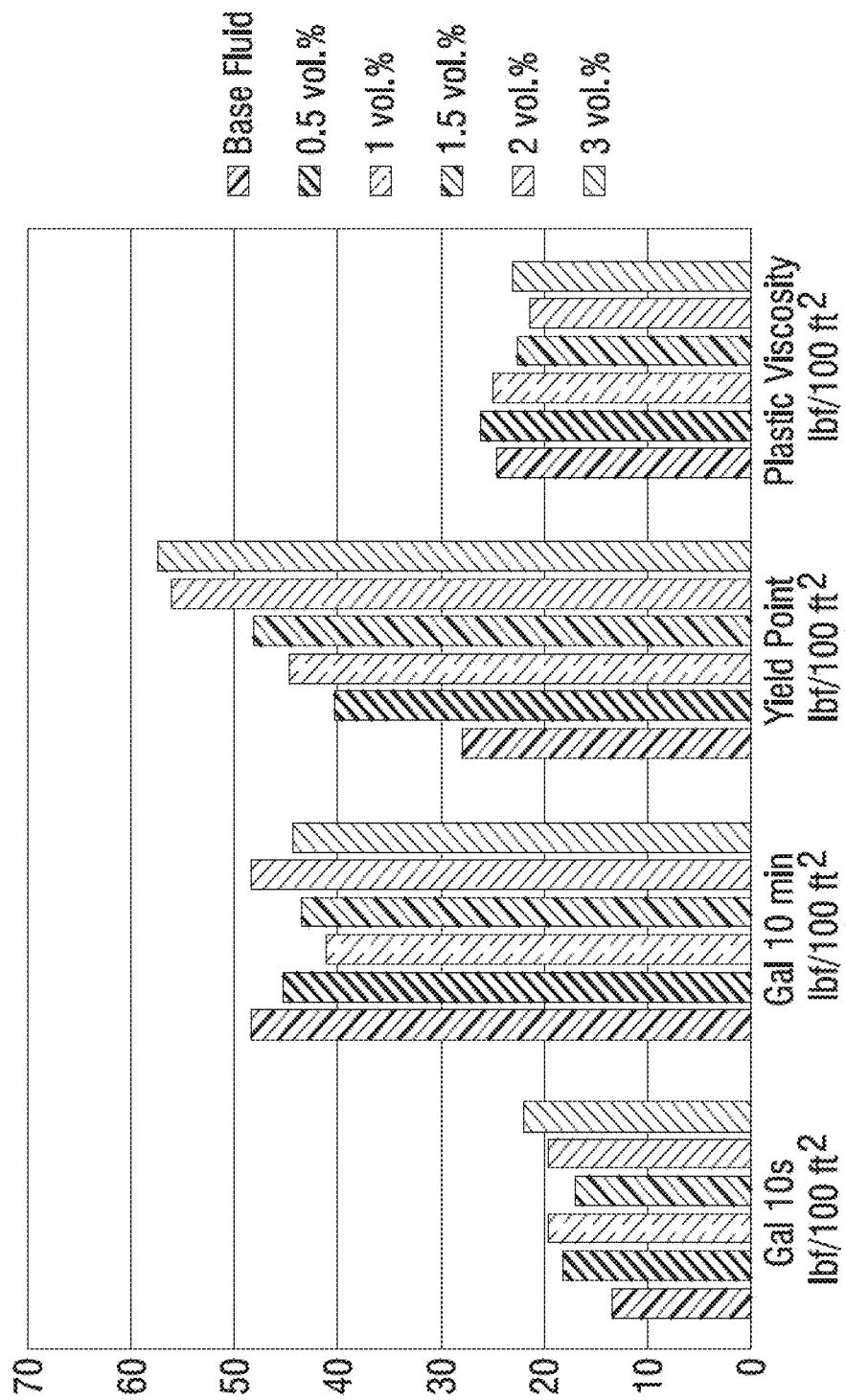
FIG. 4 is a graph showing the effect of additive concentration on drilling fluid rheological properties (80° F.).

When dial readings (shear stress) measured at room temperature were plotted versus rotational speed (shear rate) for all drilling fluid samples, it was found that adding the new additive to the drilling fluid shifted the consistency curve upward as the concentration of the new additive increased. At the same time, the slope remained almost constant, which indicates a significant increase in yield point (intercept with y-axis) without increasing the plastic viscosity (slope) (FIG. 3). FIG. 4 compares the rheological properties of all drilling fluid samples measured at room temperature. These properties are yield point, plastic viscosity, and gel strength after 10 seconds and after 10 minutes. A significant increase in yield point and gel strength was observed as the additive concentration increased, reflecting an enhancement on drilling fluid ability to suspend solid particles without significantly increasing drilling fluid plastic viscosity. Therefore, adding the new additive will require more pumping pressure on startup because of the increase in yield point, while it will not cause additional frictional pressure losses during circulation.

Figure 5:
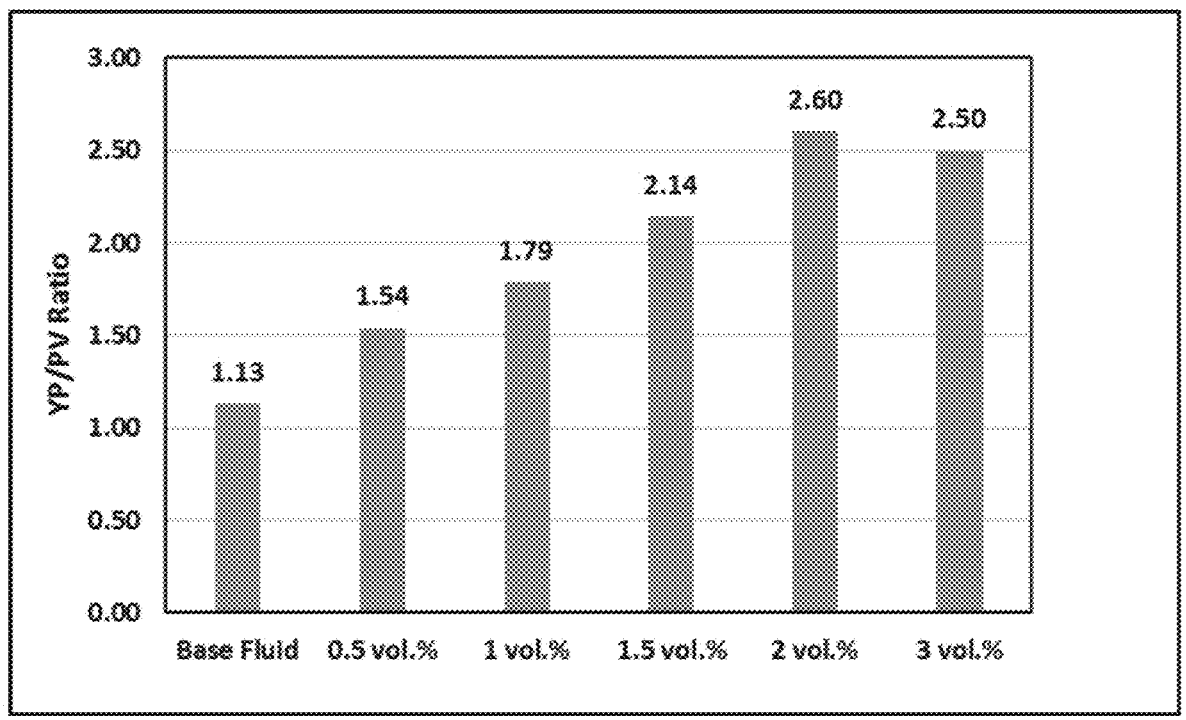
FIG. 5 is a graph showing the effect of additive concentration on drilling fluid yield point-plastic viscosity ratio (80° F.).
Figure 6:
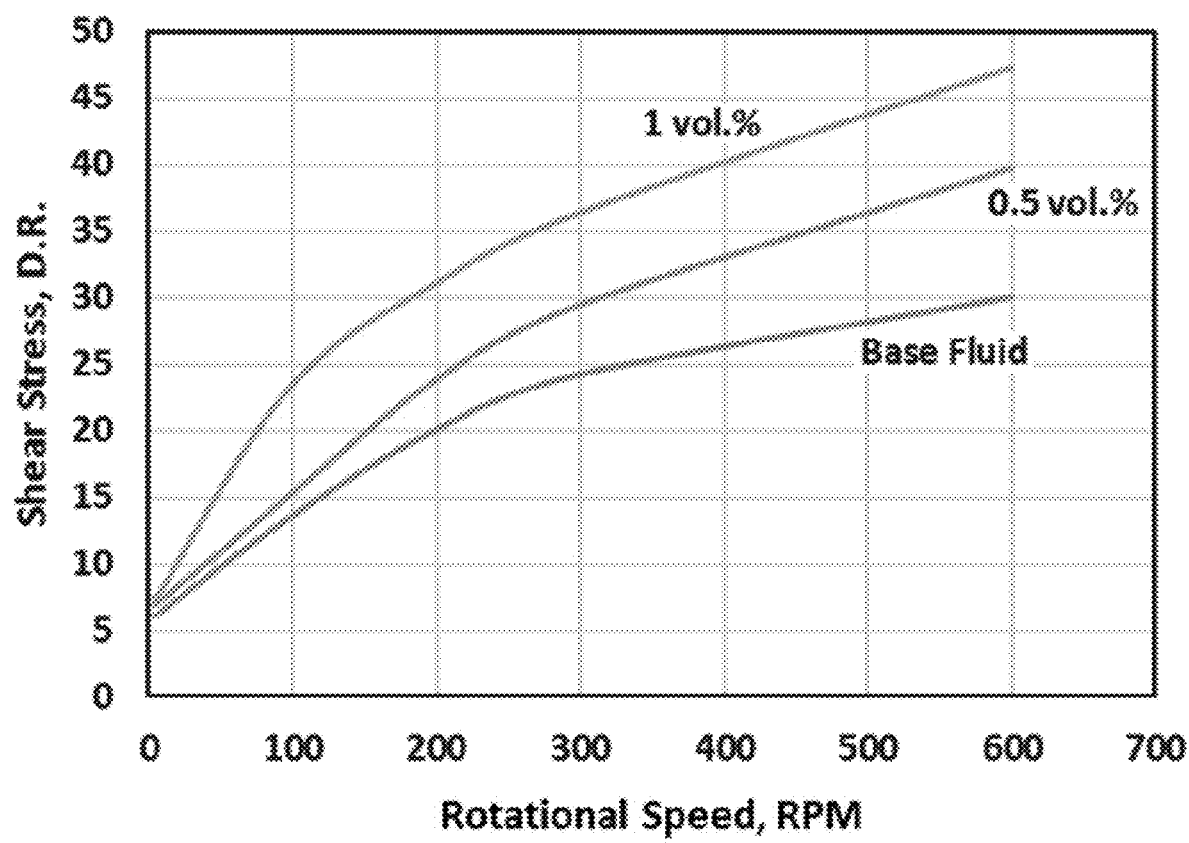
FIG. 6 is a graph showing the effect of additive concentration on drilling fluid shear stress vs. shear rate (250° F.).
Figure 7:
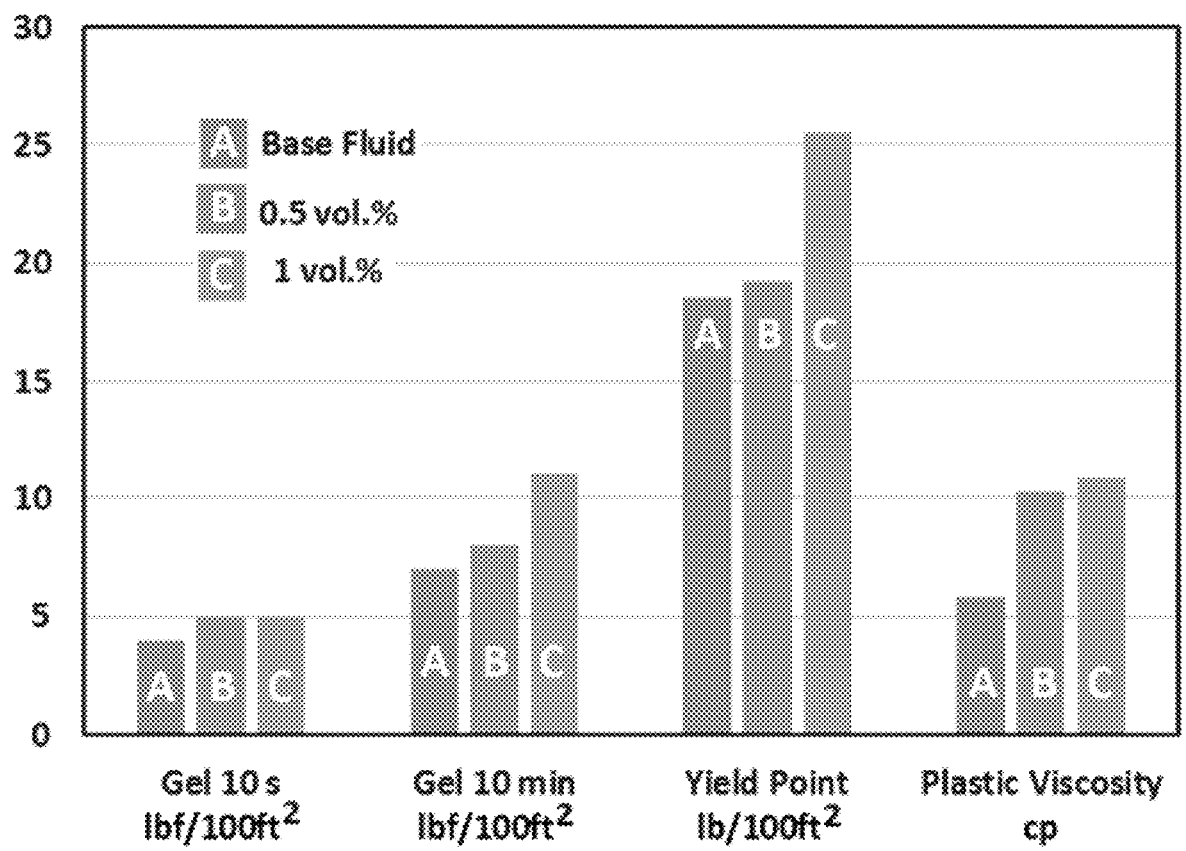
FIG. 7 is a graph showing the effect of additive concentration on drilling fluid rheological properties (250° F.)

Hole cleaning, barite sag, equivalent circulating density, surge and swab pressures, and other important drilling issues are impacted directly by yield-stress characteristics. See Power, D., and Zamora. M., 2003. Drilling Fluid Yield Stress: Measurement Techniques for Improved Understanding of Critical Drilling Fluid Parameters. Paper AADE-03-NTCE-35 presented at the AADE 2003 National Technology Conference "Practical Solutions for Drilling Challenges." Houston. April 1-3, incorporated herein by reference in its entirety. The yield point to plastic viscosity (YP/PV) ratio has been proposed as a tool to evaluate drilling fluid stability. Higher YP/PV ratios indicate more stabilization. See Chilingarian, G., Alp, E., Uslu, S., Gonzales, S., and Ronald, J., 1983. Drilling Fluid Evaluation Using Yield Point-Plastic Viscosity Correlation. Paper SPE 12469. July 27, incorporated herein by reference in its entirety. When YP/PV ratios were calculated for all drilling fluid samples, it was found that as the concentration of the new additive increased, the YP/PV ratio increased, indicating more stabilization to the drilling fluid (FIG. 5). Furthermore, drilling fluid rheology for the base fluid and with 0.5 and 1 vol. % was measured at 250° F. and 2000 psi to evaluate the performance of the new additive at high pressure and temperature. All samples showed a similar behavior to that at low temperature with lower values of yield point and plastic viscosity due to the high temperature effect (FIG. 6 and FIG. 7).

Figure 8:
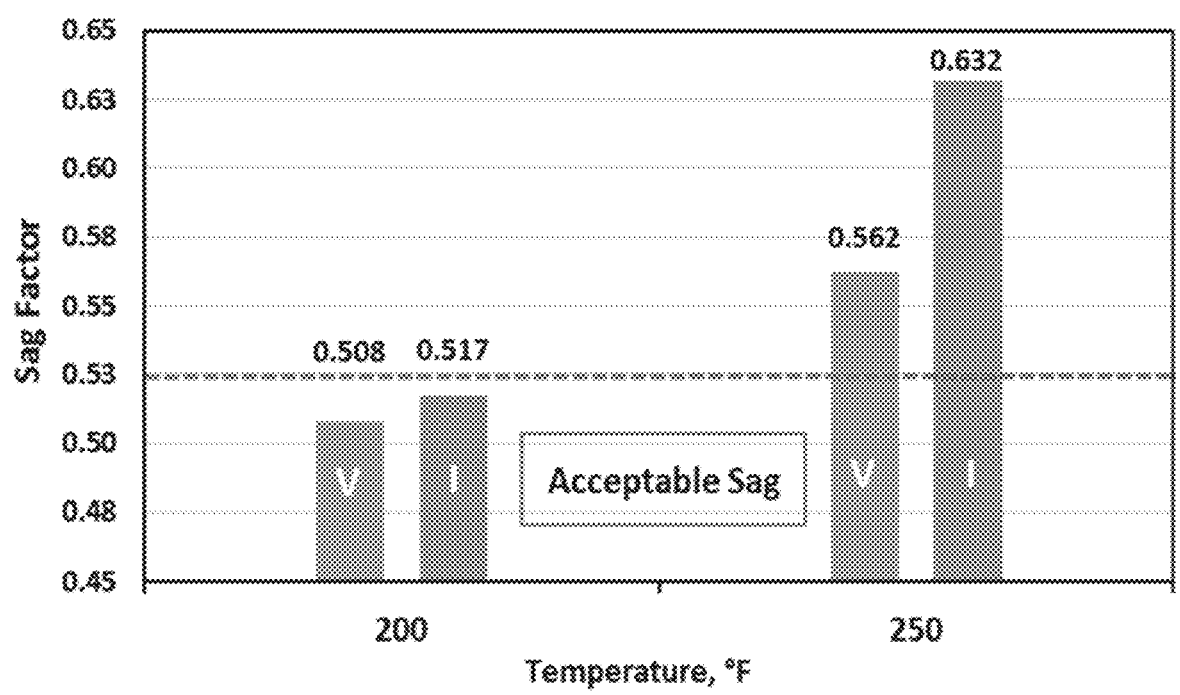
FIG. 8 shows the sag performance of base fluid at vertical (V) and inclined (I) conditions, and at 200° F. and 250° F.
Figure 9:
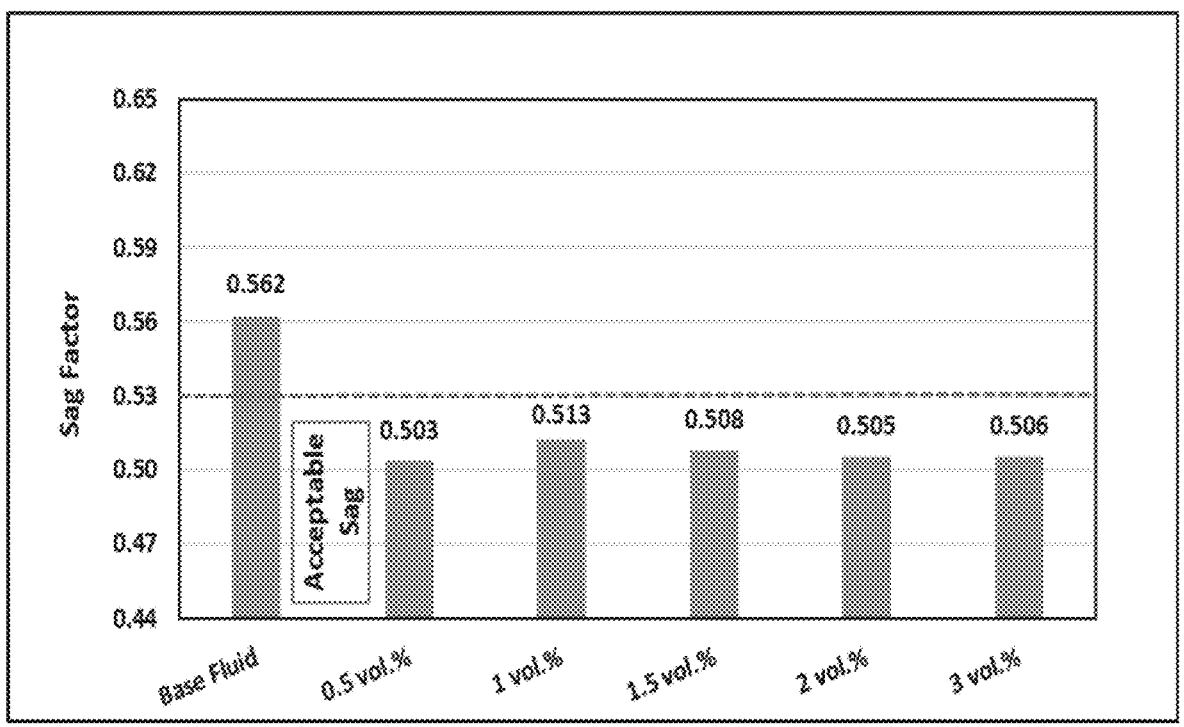
FIG. 9 shows the effect of additive concentration on sag performance at a vertical condition and 250° F.
Figure 10:
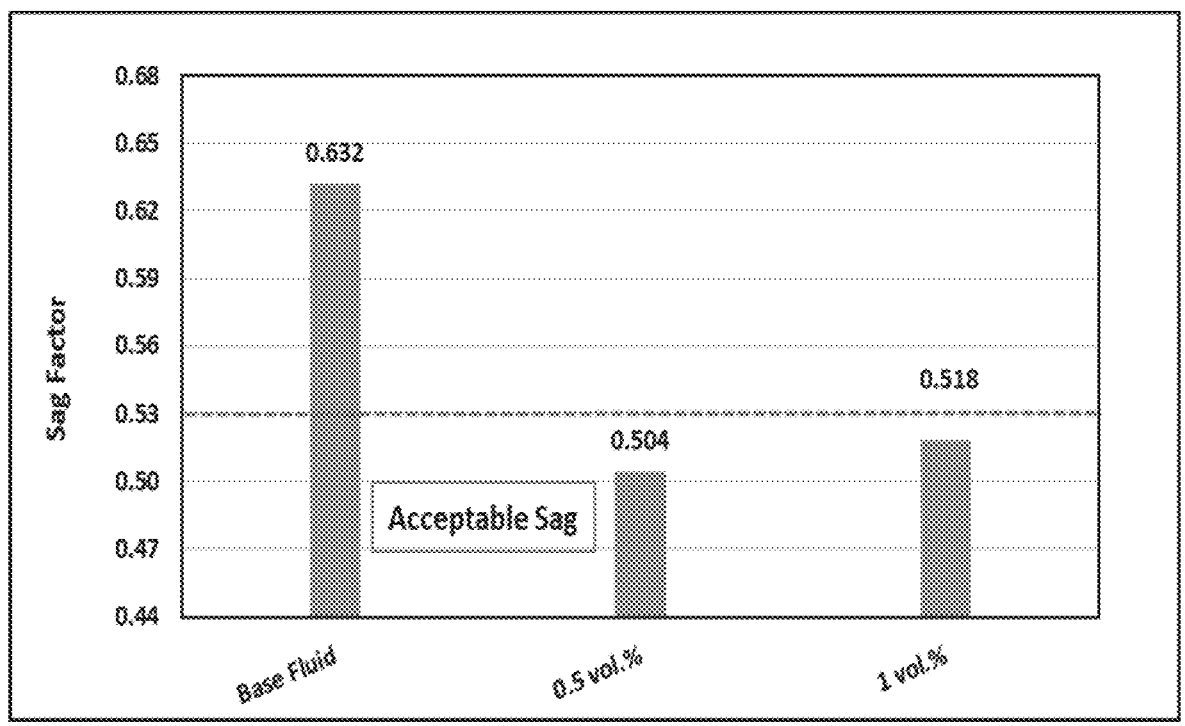
FIG. 10 shows the effect of additive concentration on sag performance at inclined condition (45° angle) and 250° F.

FIG. 8 shows the sag performance of the base drilling fluid under vertical and inclined conditions at 500 psi and at two different temperatures, 200 and 250° F. For inclined sag test, the degree of inclination was set at 45° to simulate the worst scenario since the settling process is accelerated when the inclination is above 30°. See Skalie, P., Backe, K. R., Lyornov, S. K., & Sveen, J. (1999). Barite Segregation in Inclined Boreholes. Journal of Canadian Petroleum Technology, 38(13). p. 1-6, incorporated herein by reference in its entirety. At 200° F., the base drilling fluid exhibited a god sag performance in both cases, vertical and inclined, and the sag factor was within the safe range (0.5-0.53) with a value of 0.508 and 0.517, respectively. In contrast, the base fluid showed bad sag performance at 250° F., and the sag factor was greater than 0.53 for both cases, therefore, barite sag is likely. Then, the new additive was added to the drilling fluid formulation with different concentrations, 0.5-3 vol. %, and the sag test was performed at 250° F. for both vertical and inclined conditions. As shown in FIG. 9 and FIG. 10, adding the new additive to the drilling fluid formulation showed a significant enhancement on stability and the sag factor was within the safe range (0.5-0.53) for all the drilling fluid samples; thus, barite sag is unlikely to occur at those conditions. Since adding only 0.5 vol. % to the drilling fluid formulation prevented barite sag, 0.5 vol. % can be considered as an advantageous concentration. Higher concentrations lead to an increased yield point, which, to some extent, would have a negative impact because more pumping pressure would be required on startup. Besides, increasing the concentration of additive more than needed will add more cost to the drilling operation.

Figure 11:
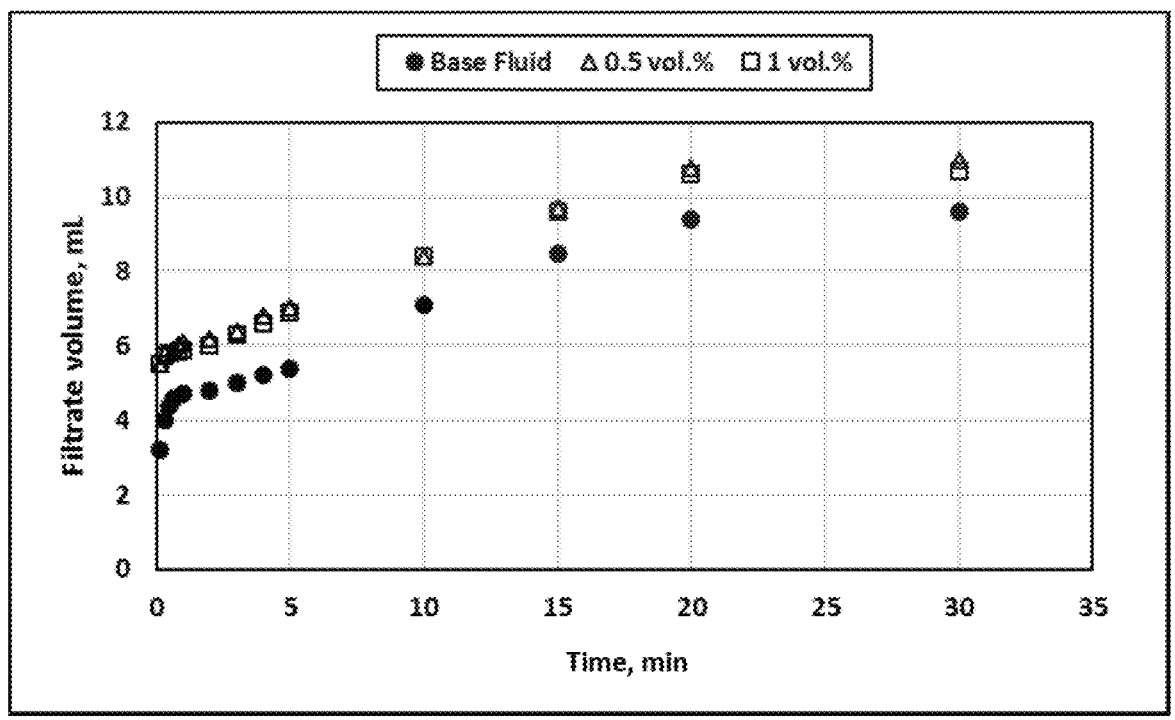
FIG. 11 shows the effect of additive concentration on filtration performance at 250° F.

FIG. 11 compares the filtration performance of base fluid, 0.5 vol. %, and 1 vol. % drilling fluid samples. The filtration experiments were performed at 250° F. and 300 psi, and run for 30 minutes. It was found that adding the new additive to the drilling fluid formulation did not affect the filtration performance significantly and all the drilling fluid samples had almost a similar filtration performance with a difference of around 1.5 mL in the total volume of fluid filtrate. Table 5 summarizes the filtration experiment results.

TABLE 5

Filtration experiments summary.

| Parameter | Base fluid | 0.5 vol. % | 1 vol. % |
|---|---|---|---|
| Filtrate volume, mL | 9.6 | 11 | 10.7 |
| Filter cake weight, g | 29.1 | 34.94 | 29.77 |
| Filter cake thickness, inches | 0.14 | 0.168 | 0.14 |

In this study, a barite-weighted drilling fluid formulation, with a density of 15 ppg, was prepared by adding and mixing the drilling fluid additives. Then, several fluid samples were prepared by adding different ratios of the new anti-sagging agent to the drilling formulation (0.5, 1, 1.5, 2, and 3 vol. % of the total base fluid). Afterwards, the effect of adding anti sagging agent on the drilling fluid properties was evaluated by measuring mud density, pH, theology, filtration, and sag tendency at low and high temperatures and both vertical and inclined conditions.

The invention claimed is:

1. A method of drilling a subterranean geological formation, comprising:
    drilling the subterranean geological formation to form a wellbore therein;
    injecting a drilling mud composition into the subterranean geological formation through the wellbore, and circulating the drilling mud composition in the wellbore;
    wherein the drilling mud composition comprises, based on a total drilling mud composition weight with weight percentages totaling to 100 wt. %:
        an aqueous base fluid in a range of from 35 to 60 wt. %;
        a viscosifier in a range of from 0.7 to 1.0 wt. %, comprising bauxite, dolomite, limestone, calcite, vaterite, aragonite, magnesite, taconite, gypsum, quartz, marble, hematite, hectorite, bentonite, limonite, magnetite, andesite, garnet, basalt, dacite. nesosilicate, orthosilicate, sorosilicate, cyclosilicate, inosilicate, phyllosilicate, tectosilicate, kaolin, montmorillonite, fullers earth, halloysite, XC-polymer, and/or xanthan gum:
        a barite weighting agent in a range of from 40 to 58 wt. %:
        a first fluid loss control additive in a range of from 1.0 to 1.2 wt. %. comprising starch guar gum, carboxymethyl cellulose, crospovidone, croscarmellose sodium, sodium starch glycolate polysaccharides, polyanionic cellulose polymer, and/or acrylic polymer; and
        an anti-sagging agent in a range of from 0.1 to 1.2 wt. %, wherein the anti-sagging agent comprises LiCl and methyl ester 5-(dimethylamino)-2-methyl-5-oxopentanoate in a range of from 40 to 70 wt. %, relative to total anti-sagging agent weight, and
        wherein a yield point/plastic viscosity ratio of the drilling mud composition is in a range of from 2.5 to 2.6,
    wherein the anti-sagging agent prevents sagging of the weighting agent in the wellbore.

2. The method of claim 1, wherein barite in the barite weighting agent is in the form of particles having a mean diameter in a range of from 20 to 70 μm.

3. The method of claim 1, wherein the LiCl is present in a range of from 1 to 2 vol. %, relative to the total anti-sagging agent weight.

4. The method of claim 1, wherein the drilling mud composition has a density in a range of from 8.34 to 20 ppg.

5. The method of claim 1, wherein a volume concentration of the methyl 5-(dimethylamino)-2-methyl-5-oxopentanoate in the drilling mud composition is in a range of from 3.0 to 4.0 vol. %, relative to a total volume of the aqueous base fluid.

6. The method of claim 1, wherein the drilling mud composition further comprises
    a second fluid-loss control additive;
    a defoamer:
    a clay stabilizer:
    a bridging agent:
    an antiscalant;
    a deflocculant:
    a lubricant:
    an anionic polyelectrolyte; and/or
    a surfactant.

7. The method of claim 1, wherein the drilling mud composition has a sag factor in a range of from 0.500 to 0.520 at a vertical condition at a temperature of in a range of from 180 to 270° F. and a pressure in a range of from 300 to 800 psi.

8. The method of claim 1, wherein the drilling mud composition has a factor that is 90% or less of a sag factor of a substantially similar drilling mud composition that does not comprise the anti-sagging agent.

9. The method of claim 1, wherein the drilling mud composition has a sag factor in a range of from 0.500 to 0.520 at an inclined condition of in a range of from 30 to 60°, at a temperature of in a range of from 180 to 270° F., and at a pressure in a range of from 300 to 800 psi.

10. The method of claim 9, wherein the sag factor is 85% or less of a sag factor of a substantially similar drilling mud composition that does not comprise the anti-sagging agent.

11. The method of claim 1, wherein the drilling mud composition has a ten-second gel strength in a range of from 14.0 to 20.0 lbf/100 ft$^2$, and a ten-minute gel strength in a range of from 40.0 to 47.0 lbf/100 ft$^2$, at a temperature in a range of from 60 to 150° F.

12. The method of claim 1, wherein the drilling mud composition has a yield point in a range of from 35 to 47 lbf/100 ft$^2$, at a temperature in a range of from 60 to 150° F.

13. The method of claim 1, wherein the drilling mud composition has a plastic viscosity in a range of from 24 to 30 cp, at a temperature in a range of from 60 to 150° F.

14. The method of claim 1, wherein the drilling mud composition has a yield point to plastic viscosity ratio in a range of from 1.15 to 1.80 lbf/(100 ft$^2$.cp), at a temperature in a range of from 60 to 150° F.

15. The method of claim 1, wherein the wellbore is a vertical wellbore, a horizontal wellbore, a multilateral wellbore, or an extended reach wellbore.

* * * * *